United States Patent [19]

Dattilo

[11] 4,261,222
[45] Apr. 14, 1981

[54] BALL BEARING CAM ASSEMBLY

[75] Inventor: Donald J. Dattilo, Mt. Prospect, Ill.

[73] Assignee: Motorola, Inc., Schaumburg, Ill.

[21] Appl. No.: 691,684

[22] Filed: Jun. 1, 1976

[51] Int. Cl.³ .................... F16H 53/06; G11B 21/02
[52] U.S. Cl. ................................ 74/569; 64/29;
74/527; 74/568 R; 360/75; 360/106
[58] Field of Search ............... 74/567, 568, 569, 122,
74/826, 84; 64/29; 360/75, 106, 104, 105, 107, 78

[56] References Cited

U.S. PATENT DOCUMENTS

| | | | |
|---|---|---|---|
| 1,883,164 | 10/1932 | Vassakos | 64/29 X |
| 2,558,502 | 6/1951 | Williams | 74/527 |
| 2,612,249 | 9/1952 | Horn | 192/104 R |
| 2,770,982 | 11/1956 | Mastney et al. | 74/527 |
| 2,836,082 | 5/1958 | Miner | 74/527 |
| 2,840,672 | 6/1958 | Martin | 74/527 |
| 2,857,782 | 10/1958 | Glueckstein et al. | 74/527 |
| 3,059,497 | 10/1962 | Eadie | 74/527 |
| 3,088,340 | 5/1963 | Shotey | |
| 3,096,665 | 7/1963 | Cappelle et al. | 74/527 |
| 3,127,786 | 4/1964 | Wooley | |
| 3,491,839 | 1/1970 | McIntire | 64/29 X |
| 3,560,672 | 2/1971 | Ludlum et al. | 74/527 X |
| 3,786,693 | 1/1974 | Keipert | 64/29 X |

Primary Examiner—Samuel Scott
Assistant Examiner—Daniel O'Connor
Attorney, Agent, or Firm—Phillip H. Melamed; James W. Gillman; Donald J. Lisa

[57] ABSTRACT

A cam assembly is disclosed which is used for the selection of different track positions for a magnetic tape head in a magnetic tape player/recorder. The tape track position of a magnetic tape head is determined by the position of a cam follower member which is selectively positioned with respect to a reference surface by selectively positioning a number of different diameter ball bearings between the cam follower member and the reference surface. Specifically, a solenoid actuated armature causes the linear movement of pawl members which in turn rotate a ratchet wheel member. The ratchet wheel member forms part of a cam apparatus that includes four ball bearings of different diameters. Sequential rotation of the ratchet member selectively positions ball bearings of different diameters between a non-rotatable reference surface and the cam follower member. Thus an accurate and inexpensive cam positioning mechanism is disclosed which uses precision ball bearings instead of an expensive cam having precisely formed surfaces to implement precise magnetic tape head position changes.

32 Claims, 2 Drawing Figures

BALL BEARING CAM ASSEMBLY

BACKGROUND OF THE INVENTION

The invention generally relates to the field of precision cam assemblies and more particularly relates to the field of the use of such assemblies for controlling the selection of different track positions for a magnetic tape head in a magnetic tape player/recorder.

Prior art cam assemblies generally comprise a cam member having cam surfaces, a cam follower which is mechanically coupled to the cam member and an apparatus for providing relative movement of the cam member with respect to the cam follower. Relative movement of the cam member causes different portions of the cam surfaces to contact the cam follower and produce corresponding movement of the cam follower. Whenever precise movement of the cam follower is required, such as when the cam follower movement controls the track (height) position of a magnetic tape head in a tape player, various cam surfaces must be provided which bear a precise relationship to each other. Generally, prior art cam assemblies have used a unitary cam member which has a plurality of cam surfaces on it, all of which bear a precise dimensional relationship with respect to each other. These precision cam members have therefore been relatively expensive due to the exact tolerances which must be maintained for their manufacture. U.S. Pat. No. 3,624,309, which is by the same inventor and assigned to the same assignee as the present invention, illustrates the use of such a prior art cam assembly to control the track position of a magnetic tape head.

SUMMARY OF THE INVENTION

An object of the present invention is to provide an improved, inexpensive and accurate cam assembly which overcomes the aforementioned deficiencies of the prior art cam assemblies.

A more particular object of the invention is to provide an improved cam assembly for use in selecting the different track positions for a magnetic tape head in a magnetic tape player/recorder.

A further object of the invention is to provide an improved cam assembly in which precise ball bearings are used in conjunction with a reference surface to provide accurate displacement of a cam follower member.

Another object of the invention is to provide an improved multi-track tape player in which an improved cam assembly is used to position the magnetic tape head with respect to the several tracks on a magnetic tape.

In one embodiment of the present invention a cam assembly is provided which includes; at least one reference surface, at least one cam follower member adaptable for being positioned at several different predetermined distances away from the reference surface, and cam means including at least a first and second ball bearing for selectively altering the position of the cam follower member with respect to the reference surface by selectively providing the first and second ball bearings between the cam follower member and the reference surface.

A portion of a multi-track tape player/recorder which has a magnetic tape head, tape drive apparatus and tape track selection apparatus is illustrated. The multi-track tape player/recorder includes an improved cam assembly having at least one reference surface, at least one cam follower member for controlling the track position of the tape head and a cam means including a first ball bearing having a first diameter and a second ball bearing having a second diameter for selectively altering the position of the cam follower member with respect to the reference surface by selectively positioning the first and second ball bearings between the cam follower member and the reference surface. The selective use of the first and second ball bearings thereby provides the selection of different precise positions for the cam follower member and thus results in the selection of different precise positions of the magnetic tape head. By using inexpensive precise ball bearings in conjunction with a reference surface, the requirement for a precisely formed cam having a plurality of precise surfaces is eliminated. Therefore an inexpensive and relatively simple cam assembly has been provided in which the diameters of precision ball bearings are used to create the selection of different precise positions for the magnetic tape head of a tape player/recorder. The structural details of the present invention are more fully elaborated on subsequently in the detailed description of the preferred embodiment.

BRIEF DESCRIPTION OF THE DRAWINGS

For a more complete understanding of the invention, reference should be made to the drawings, in which.

DESCRIPTION OF THE PREFERRED EMBODIMENT

Figure 1:
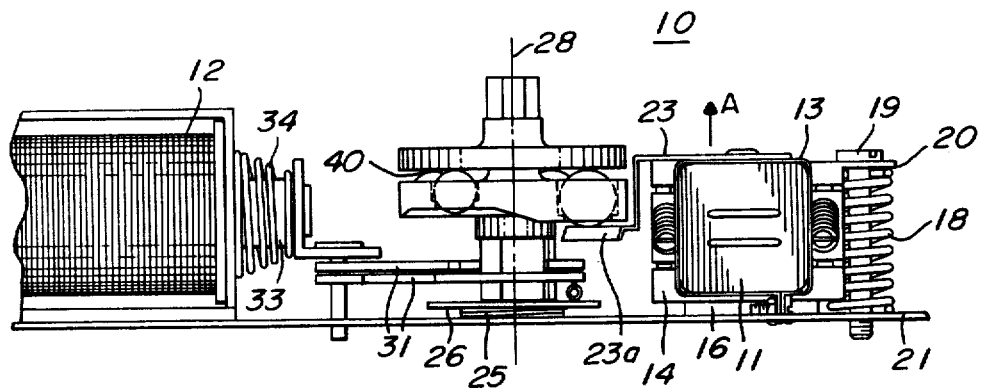
FIG. 1 is an assembled side view of an improved cam assembly in a magnetic tape player/recorder which is used for positioning the height of a magnetic tape head.
Figure 2:
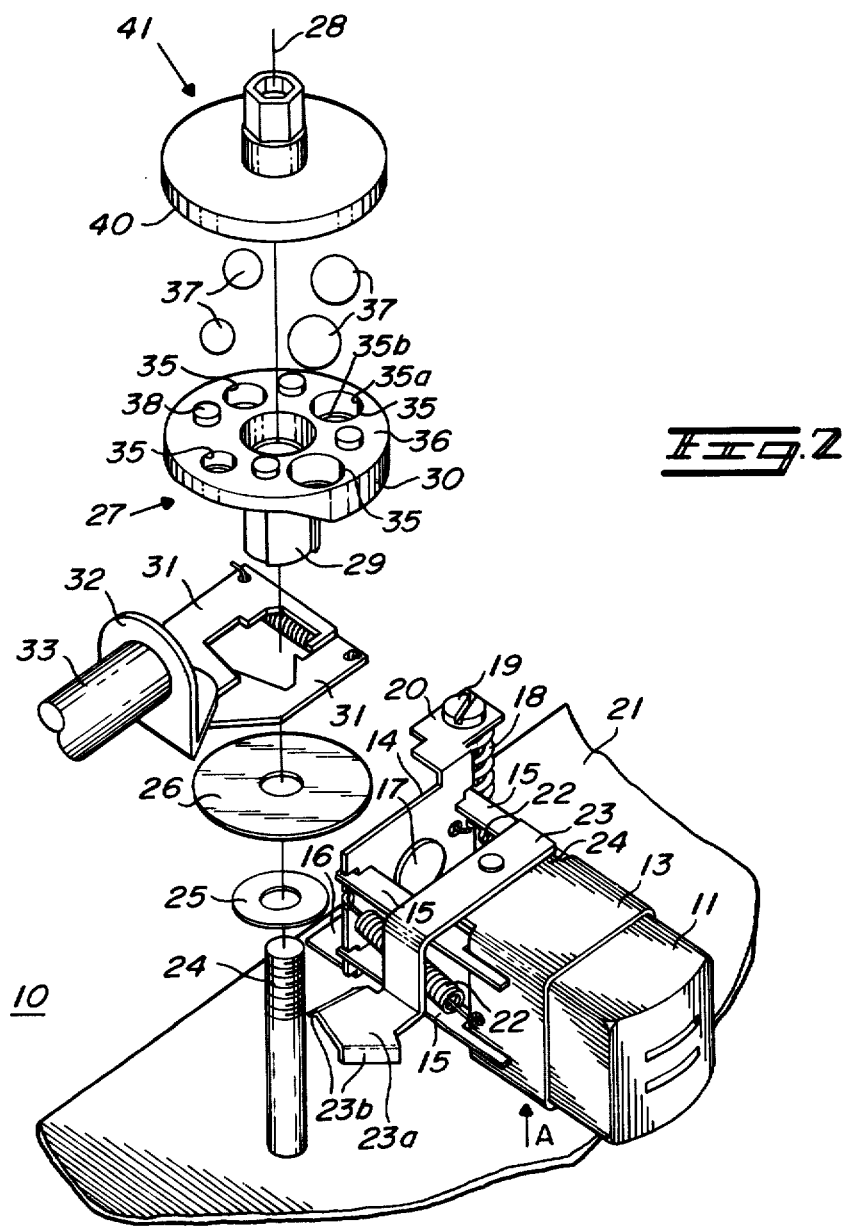
FIG. 2 is an exploded perspective view of portions of the cam assembly illustrated in FIG. 1.

FIGS. 1 and 2 illustrate an improved cam assembly 10 which in part of a magnetic tape player/recorder (not fully shown). The tape player/recorder includes a magnetic tape head 11 adaptable for sensing several tracks of a magnetic tape, drive apparatus (not shown) for moving the magnetic tape past the tape head 11 and selection apparatus which includes the cam assembly 10 and which actuates a solenoid 12 for adjusting the track position of the magnetic tape head 11 with respect to the magnetic tape so that one of several tape tracks of the tape is selected for sensing by the head. Since the identical apparatus is illustrated in FIGS. 1 and 2, identical reference numbers will be used to designate corresponding components.

The magnetic tape head 11 is mounted in a generally rectangularly shaped metal bracket 13 which is coupled to a support plate 14 by four parallel arm members 15 which are pivotal at their connection points to the support plate 14. The support plate 14 is rotatably mounted to a support bracket 16 by a relatively large circular rivet 17. The rotational position of the support plate 14 with respect to the bracket 16 is controlled by a spring 18 and a screw 19 which passes through an extending portion 20 of the support plate 14, through the center of the coil spring 18 and is received by a threaded opening in a chassis 21 of the tape player. The support bracket 16 is rigidly attached to the chassis 21. Adjustment of the screw 19 provides for rotating the plate 14 with respect to the bracket 16 and thereby provides rotation of the magnetic tape head 11.

A pair of springs 22 are coupled between the support late 14 and the head mounting bracket 13. The springs are mounted such that they are in tension and normally extend in a downward direction from the support plate 14 to the bracket 13. This positioning results in biasing the tape head 11 in an upward direction as generally indicated by the reference arrow A. A cam follower member 23 is riveted to an extending portion 24 of the head mounting bracket 13 and has a portion 23a which extends away from the tape head 11 and support bracket 13. The cam follower portion 23a has angled side projections 23b which aid in providing smooth transistions between the different vertical positions of the cam follower portion 23a that will be selected by the cam assembly 10.

Basically, all of the components described so far provide a rotatably adjustable tape head 11 having a cam follower member 23 rigidly coupled to the tape head and mechanically biased in the direction A. While the specific components which provide this result have been described, the use of any tape head positioning assembly which provides this result is contemplated by the present invention.

A cylindrical mounting stud 24 has one end rigidly mounted directly to the chassis 21 and extends in an upward direction corresponding to the direction A. The stud is threaded at its upper one-third extending end portion. A wave washer 25 is mounted on the stud 24 and is positioned adjacent to the chassis 21. The wave washer provides a slight mechanical spring bias in the A direction for the subsequent components which are to be mounted on the stud 24. A flat washer 26 having a larger outer diameter than the wave washer 25 is mounted on the stud 24 on the top of the wave washer. A ratchet wheel member 27 is mounted on the stud 24 on top of the washer 26 and is rotatable about the central longitudinal axis of the stud which is designated by the reference number 28. The ratchet member 27 comprises a lower ratchet wheel portion 29 and an upper ball bearing cage structure 30 which has a generally cylindrical shape. Pawl members 31 are positioned about the ratchet wheel portion 29 and are connected to a bracket 32 which is rigidly connected to an armature 33 of the solenoid 12. A spring 34 is used for mechanically biasing and positioning the pawl members 31 when the solenoid 12 is deenergized. The operation of the solenoid 12, pawl members 31 and ratchet wheel 29 is well known to those of ordinary skill in the art and therefore will not be discussed in any detail. The basic function of these members is to provide for a quarter turn revolution of the ratchet member 27 about the axis 28 in response to the actuation and deactuation of the solenoid 12. Thus four nominal rotary positions of the member 27 with respect to the axis 28 are provided.

The ball bearing cage 30 is generally disc shaped and has a larger diameter than the ratchet portion 29. This creates an outer peripheral area of the ball bearing cage 30. Four cylindral through holes 35 each having different diameter dimensions are provided in the outer peripheral portion of the ball bearing cage 30. Each of the holes 35 comprise a first diameter portion 35a which opens onto a top surface 36 of the cage member 30 and a smaller diameter portion 35b which does not open onto the top surface 36 but opens onto the bottom surface of the ball bearing cage 30. Four precision metallic ball bearings 37 are positioned in each of the openings 35, each ball bearing having a different diameter dimension. The first diameter portion 35a is larger than the diameter of its corresponding ball bearing and the second diameter portion 35b is smaller than the diameter of its corresponding ball bearing. Thus the smaller diameter portion 35b forms a seating structure for the ball bearing.

Four short cylindrically shaped spacing projections 38 are present on the surface 36 and are used for determining the minimum possible distance between the top surface 36 of the ball bearing cage 30 and a reference surface 40 which forms the bottom surface of a generally disc shaped member 41 which is screwed on to the threaded portion of the stud 24 on top of the ratchet member 27. The reference surface 40 is planar and lies in substantially a single plane. This reference surface together with the smaller diameter portions 35b form a captivating structure for the ball bearings 37 and retain these ball bearings such that they will remain substantially positioned between the smaller diameter portions 35b and the reference surface 40. The minimum spacing between the surface 40 and the smaller diameter portions 35 b is determined by the spacing projections 38, not by the ball bearings 37. The wave washer 25 provides spring bias for biasing the ball bearing cage member 30 toward the reference surface 40 and therefore insuring that the ball bearings will remain captivated during the rotation of the ratchet wheel 27.

The spacing projections 38 prevent the reference surface 40 from exerting a large force against the ball bearings 37 when the member 41 is screwed on to the stud 24 during the assembly of all the components which are mounted on the stud 24. The member 41 is contemplated as being constructed such that it forms a self-locking locknut when it is screwed onto the stud 24. Thus the member 41 will not rotate about the axis 28 during the rotation of the ratchet wheel 27 and ball bearings 37. The locknut construction of the member 41 provides for easily adjusting the position of the reference surface 40 with respect to the chassis 21 and retaining the member 41 in its adjusted position.

The cam follower projection 23a is positioned with respect to the threaded stud 24 and ball bearing cage 30 such that at the four different nominal rotational positions of the ratchet wheel member 27, each one of the four different diameter ball bearings 37 will be positioned between the reference surface 40 and the cam follower projection 23a. The cam follower 23 is located in a substantial fixed rotary position with respect to the axis 28 in a plane perpendicular to the axis 28. In other words, the cam follower 23 is not rotatable about the axis 28 and only moves in directions parallel to the axis 28 in response to the rotation of the wheel 27.

The operation of the present invention will now be discussed in detail. The cam follower member 23 determines the vertical position of the tape head 11 in the A direction. The cam follower portion 23a is adaptable for being positioned at several different predetermined distances with respect to the reference surface 40 and the position of the reference surface with respect to the chassis 21 is adjustable. The solenoid 12, the pawl members 31, the ratchel wheel 27 and the ball bearings 37 generally form a cam means which includes at least a first and second ball bearing which selectively alters the position of the cam follower 23 with respect to the reference surface 40 by selectively positioning the first and second ball bearings between the portion 23a of the cam follower member and the reference surface 40. The cam follower 23 is biased toward the reference surface 40 in the A direction by the springs 22 and the distance between the cam follower portion 23a and the reference surface, in each of the four rotary positions of the wheel 27, is determined by the diameter of one of the precision ball bearings 37, as is clearly illustrated in FIG. 1.

When a change in the vertical position of the tape head 11 is desired, the solenoid 12 is actuated and subsequently deactuated. This results in linear movement of the solenoid armature 33 which imparts a linear movement to the pawl members 31 in response thereto. The linear movement of the pawl members 31 results in a quarter turn revolution of the ratchet wheel 27 by principles which are well known to those of ordinary skill in the art. This quarter turn of the ratchet wheel results in positioning a different one of the ball bearings 37 between the cam follower portion 23a and the reference surface 40. Thus a different vertical position of the magnetic tape head 11 has been provided.

Both the cam follower 23 and the reference member 40 remain in fixed rotary positions with respect to the axis 28 during the rotation of the ratchet wheel 27. Thus the rotation of the rachet wheel results in the vertical movement of the tape head 11 and the amount of this vertical movement is totally determined by the difference in the diameters of the ball bearings 37 which are provided between the cam follower portion 23a and the reference surface 40. Precision ball bearings are extremely inexpensive compared to the cost of a manufactured cam which has cam surfaces that are precisely positioned with respect to each other. Thus the present invention has provided an improved cam assembly in which precision changes in the position of a cam follower has been implemented by the use of precision ball bearings rather than by the use of an expensive cam having surfaces which are precisely formed on it.

Initial adjustment of the vertical position of the tape head 11 is accomplished by altering the position of the reference member 41 on the stud 24. Thus the initial vertical position of the tape head is accomplished by a simple screw adjustment of the reference member 41. Rotation of the tape head 11 is accomplished by rotating the plate 14 in response to the adjustment of the screw 19. Four different vertical positions of the tape head 11 are provided by the cam assembly 10 illustrated in FIGS. 1 and 2 and the movement of the tape head between these positions is precisely controlled by the diameters of precision ball bearings. Thus an inexpensive, accurate, and readily adjustable cam assembly has been provided for adjusting the position of a magnetic head in a tape player/recorder.

While the preferred embodiment of the present invention illustrates the rotation of the wheel 27 by the combination of a ratchet portion 29 and pawl members 31, any rotation drive apparatus can be used with the present invention. In fact, the use of a ball bearing cam assembly can be implemented without the use of any rotational movement. While I have shown and described a specific embodiment of this invention, further modifications and improvements will occur to those skilled in the art. All such modifications which retain the basic underlying principles which are disclosed and claimed herein are within the scope of this invention.

I claim:

1. A cam assembly comprising:
   at least one reference surface,
   at least one cam follower member, and
   cam means including at least first and second ball bearings having diameters for selectively positioning said cam follower member at a plurality of different predetermined distances with respect to said reference surface by selectively positioning said first and second ball bearings between said cam follower member and said reference surface, said plurality of different distances being related to the diameters of said first and second ball bearings.

2. A cam assembly according to claim 1 wherein said first ball bearing diameter is different from said second ball bearing diameter.

3. A cam assembly according to claim 2 wherein said plurality of different distances are equal to the diameters of said first and second ball bearings.

4. A cam assembly according to claim 3 which includes spring means for mechanically biasing said cam follower member and said reference surface towards each other.

5. A cam assembly according to claim 4 wherein said cam means includes means for selectively changing the position of at least one of said ball bearings with respect to said cam follower member.

6. A cam assembly according to claim 5 wherein said changing means provides for rotating the positions of said ball bearings about an axis and wherein said cam follower member and said reference surface are positioned in substantially fixed rotary positions with respect to said axis.

7. A cam assembly according to claim 6 wherein said cam means includes means which cooperates with said reference surface for captivating said ball bearings.

8. A cam follower assembly according to claim 6 wherein said moving means includes a ratchet assembly having linearly moveable pawl members and at least one rotatable ratchet wheel rotated in response to the linear movement of said pawl members.

9. A cam assembly according to claim 8 wherein said moving means includes a solenoid having an armature mechanically coupled to said pawl members for inparting linear movement to said pawl members in response to solenoid actuation.

10. A cam assembly according to claim 9 wherein said ratchet wheel is rotatably mounted on a stud which coincides with said axis and wherein said reference surface is contained on a stationary disc which is also mounted on said stud.

11. A cam assembly according to claim 7 wherein said captivating means includes structure having through-hole openings corresponding to each of said ball bearings, each opening comprising a portion having a diameter smaller than the diameter of the corresponding ball bearing, said ball bearing being positioned substantially between said smaller diameter portion and said reference surface.

12. A cam assembly according to claim 11 wherein said captivating means includes spacing means for determining the distance between said reference surface and said smaller diameter poriton of said captivating means.

13. A cam assembly according to claim 12 wherein said reference surface is substantially planar.

14. A cam assembly according to claim 13 wherein said reference surface lies substantially in a single plane.

15. A cam assembly according to claim 14 wherein said reference surface is contained on a generally disc shaped member which is adjustably mounted on a structure for being adjustably positionable in directions parallel to said axis.

16. A cam assembly according to claim 15 which includes an additional spring means for biasing said captivating means toward said reference surface.

17. A cam assembly according to claim 16 wherein said position changing means includes a ratchet assembly having a linearly moveable pawl member and at least one rotatable ratchet wheel rotated in response to the linear movement of the pawl member.

18. A cam assembly according to claim 17 wherein said moving means includes a solenoid having an armature mechanically coupled to said pawl member to impart linear motion thereto in response to the actuation of said solenoid.

19. A cam assembly according to claim 18 wherein said ratchet wheel is rotatably mounted on a stud which coincides with said axis.

20. A multi-track tape player/recorder including a chassis, a magnetic tape head adaptable for sensing several tracks of a magnetic tape, drive apparatus for moving magnetic tape past the tape head and selection apparatus for adjusting the position of the magnetic tape head with respect to the magnetic tape so that one of the several tape tracks is selected for sensing by the head, the improvement comprising
  a cam assembly including;
  at least one reference surface,
  at least one cam follower member means for controlling the track position of said tape head with respect to said tape, and
  cam means including at least first and second ball bearings having diameters for selectively positioning said cam follower member means at a plurality of different predetermined distances with respect to said reference surface by selectively positioning said first and second ball bearings between said cam follower member means and said reference surface, said plurality of different distances being related to the diameters of said first and second ball bearings, whereby the selection of different positions for said cam follower member means results in the selection of different tracks of the magnetic tape by changing the relative position of the magnetic tape head with respect to the magnetic tape and the chassis of the tape player.

21. A multi-track tape player/recorder according to claim 20 wherein said first ball bearing diameter is different from said second ball bearing diameter.

22. A multi-track tape player/recorder according to claim 21 wherein said plurality of different distances are equal to the diameters of said first and second ball bearings.

23. A multi-track tape player/recorder according to claim 22 which includes spring means for mechanically biasing said cam follower member means and said reference surface towards each other.

24. A multi-track tape player/recorder according to claim 23 wherein sid cam means includes means for selectively changing the position of at least one of said ball bearings with respect to said cam follower member means.

25. A multi-track tape player/recorder according to claim 24 wherein said changing means provides for rotating the positions of said ball bearings about an axis and wherein said cam follower member means is positioned in a substantially fixed rotary position with respect to said axis.

26. A multi-track tape player/recorder according to claim 25 wherein said reference surface is adjustably mounted on a structure for adjustably positioning the reference surface with respect to the chassis.

27. A multi-track tape player/recorder according to claim 20 wherein said cam means includes means for moving said ball bearings with respect to both said reference surface and said cam follower during the selective positioning thereof.

28. A multi-track tape player/recorder according to claim 27 wherein said ball bearing moving means includes a rotatable captivating structure having through-hole openings corresponding to each of said ball bearings, each opening comprising a portion having a diameter smaller than the diameter of the corresponding ball bearing, said ball bearing being positioned substantially between said smaller diameter portion and said reference surface.

29. A method for selectively positioning a cam follower member at a plurality of precise different predetermined distances away from a reference point on a reference surface, comprising the steps of:
  positioning a cam follower member at a first predetermined distance away from a reference point on a reference surface by positioning a first ball bearing having a diameter therebetween; and
  positioning said cam follower member at a second predetermined distance away from said reference point by positioning a second ball bearing having a diameter therebetween, said first and second distances being related to said first and second ball bearing diameters respectively.

30. A method for selectively positioning a cam follower member according to claim 29 wherein said first and second distances are equal to said first and second diameters, respectively, and wherein said ball bearings are contacted by said cam follower member and pressed against said reference point on said reference surface to determine said first and second distances.

31. A method for selectively positioning a cam follower member according to claim 29 wherein the positioning of said cam follower member at said first and second predetermined distances occurs by rotating said first and second ball bearings about an axis while maintaining said cam follower member and said reference point on said reference surface in substantially fixed rotary positions with respect to said axis.

32. A method for selectively positioning a cam follower member according to claim 31 wherein said first and second distances are equal to said first and second diameters, respectively, and wherein said ball bearings are contacted by said cam follower member and pressed against said reference point on said reference surface to determine said first and second distances.

* * * * *